(12) United States Patent
Barker et al.

(10) Patent No.: US 12,404,052 B2
(45) Date of Patent: Sep. 2, 2025

(54) SELF-ALIGNING LIQUID COUPLER SYSTEMS AND RELATED METHODS

(71) Applicant: Deere & Company, Moline, IL (US)

(72) Inventors: Mark E. Barker, Johnston, IA (US); Nikhil V. Wagher, Champaign, IL (US)

(73) Assignee: Deere & Company, Moline, IL (US)

( * ) Notice: Subject to any disclaimer, the term of this patent is extended or adjusted under 35 U.S.C. 154(b) by 321 days.

(21) Appl. No.: 18/153,867

(22) Filed: Jan. 12, 2023

(65) Prior Publication Data

US 2023/0166840 A1 Jun. 1, 2023

Related U.S. Application Data

(62) Division of application No. 16/888,440, filed on May 29, 2020, now Pat. No. 11,618,563.

(Continued)

(51) Int. Cl.
| | |
|---|---|
| *B64C 39/02* | (2023.01) |
| *B64D 1/18* | (2006.01) |
| *B64D 1/22* | (2006.01) |
| *B64F 1/28* | (2006.01) |
| *B64U 70/99* | (2023.01) |
| *B67D 7/02* | (2010.01) |
| *B67D 7/30* | (2010.01) |

(Continued)

(52) U.S. Cl.
CPC ............... *B64U 70/99* (2023.01); *B64D 1/18* (2013.01); *B64D 1/22* (2013.01); *B64F 1/28* (2013.01); *B67D 7/0294* (2013.01); *B67D 7/302* (2013.01); *B67D 7/406* (2013.01); *B64U 10/14* (2023.01); *B64U 2101/45* (2023.01)

(58) Field of Classification Search
CPC .... B64U 70/99; B64U 10/14; B64U 2101/45; B64D 1/18; B64D 1/22; B64F 1/28; B67D 7/0294; B67D 7/302; B67D 7/406
See application file for complete search history.

(56) References Cited

U.S. PATENT DOCUMENTS

| | | |
|---|---|---|
| 3,095,020 A | 6/1963 | Darwin |
| 3,581,769 A | 6/1971 | Haley et al. |

(Continued)

FOREIGN PATENT DOCUMENTS

| | | |
|---|---|---|
| CN | 108128747 | 6/2018 |
| CN | 207535770 U | 6/2018 |

(Continued)

OTHER PUBLICATIONS

European Patent Office, "European Search Report," issued in connection with European Appl. No. 20195117.5, dated Feb. 3, 2021, 10 pages.

(Continued)

*Primary Examiner* — Donnell A Long
(74) *Attorney, Agent, or Firm* — Hanley, Flight & Zimmerman, LLC

(57) ABSTRACT

Methods, apparatus, systems and articles of manufacture are disclosed for a first link to rotate about a pin joint, a second link rotatably coupled to the first link, the second link having a nozzle at a first end and a weight at a second end opposite the first end, and a fluid inlet including a funnel portion and an opening, the funnel portion having a conical taper converging towards the opening.

7 Claims, 12 Drawing Sheets

Related U.S. Application Data

(60) Provisional application No. 62/897,376, filed on Sep. 8, 2019.

(51) Int. Cl.
  *B67D 7/40* (2010.01)
  *B64U 10/14* (2023.01)
  *B64U 101/45* (2023.01)

(56) References Cited

U.S. PATENT DOCUMENTS

| | | | |
|---|---|---|---|
| 3,651,832 A | | 3/1972 | Meyer |
| 3,805,834 A | * | 4/1974 | Bily .................. B67D 9/02 |
| | | | 141/387 |
| 4,142,551 A | * | 3/1979 | Wilms ................ B67D 9/02 |
| | | | 212/308 |
| 4,341,242 A | | 7/1982 | Hermanson |
| 4,416,306 A | * | 11/1983 | Le Devehat ......... B67D 9/02 |
| | | | 141/387 |
| 4,418,718 A | * | 12/1983 | Fusy .................. B67D 9/02 |
| | | | 141/387 |
| 5,906,336 A | | 5/1999 | Eckstein |
| 7,837,151 B1 | | 11/2010 | Garcia, Jr. |
| 8,006,850 B2 | * | 8/2011 | Rotheisler ........... B66C 23/14 |
| | | | 212/196 |
| 9,139,310 B1 | | 9/2015 | Wang |
| 9,403,669 B2 | * | 8/2016 | Fusy .................. B67D 9/02 |
| 9,783,075 B2 | | 10/2017 | Henry et al. |
| 10,941,032 B2 | * | 3/2021 | Waguespack ......... B63B 27/24 |
| 11,618,563 B2 | | 4/2023 | Barker et al. |
| 2006/0011242 A1 | | 1/2006 | Meyerinck |
| 2019/0211947 A1 | | 7/2019 | Butcher |
| 2020/0207483 A1 | | 7/2020 | Meidad |
| 2021/0147095 A1 | | 5/2021 | Meidad |
| 2021/0202959 A1 | | 7/2021 | Sheerin |

FOREIGN PATENT DOCUMENTS

| | | |
|---|---|---|
| CN | 109018413 A | 12/2018 |
| EP | 0418744 | 3/1991 |
| KR | 20120140626 | 12/2012 |
| WO | 2017138803 | 8/2017 |

OTHER PUBLICATIONS

United States Patent and Trademark Office, "Non-Final Office Action," issued in connection with U.S. Appl. No. 16/888,440, dated Aug. 12, 2022, 7 pages.

United States Patent and Trademark Office, "Notice of Allowance and Fee(s) Due," issued in connection with U.S. Appl. No. 16/888,440, dated Dec. 2, 2022, 5 pages.

* cited by examiner

SELF-ALIGNING LIQUID COUPLER SYSTEMS AND RELATED METHODS

RELATED APPLICATIONS

This patent arises from a divisional of U.S. patent application Ser. No. 16/888,440 (now U.S. Pat. No. 11,618,563), which was filed on May 29, 2020, and claims the benefit of U.S. Provisional Patent Application No. 62/897,376, which was filed on Sep. 8, 2019. U.S. patent application Ser. No. 16/888,440 and U.S. Provisional Patent Application No. 62/897,376 are hereby incorporated herein by reference in their entireties. Priority to U.S. patent application Ser. No. 16/888,440 and U.S. Provisional Patent Application No. 62/897,376 is hereby claimed.

FIELD OF THE DISCLOSURE

This disclosure relates generally to fluid exchange, and, more particularly, to self-aligning liquid coupler systems and related methods.

BACKGROUND

Aerial vehicles are used in agriculture for the aerial application of, for example, fluid fertilizer and/or pesticides (e.g., herbicides, insecticides, etc.) onto crops. In recent years, unmanned aerial vehicles (UAVs) and have increasingly been used to distribute fluid fertilizer and/or pesticides. Some UAVs such as quadrotor helicopters (e.g., quadcopters) used in agriculture operate largely autonomously. These autonomous UAVs are often much smaller than their manned and/or non-autonomous counterparts (e.g., manned aerial vehicles, non-autonomous UAVs) in part due to the extensive cost and regulation associated with autonomous UAVs. These autonomous UAVs typically have much smaller fluid payloads compared to manned aerial vehicles and thus require refilling of their fluid stores (e.g. of fluid fertilizer or pesticide) and/or fuel stores at relatively shorter intervals.

DETAILED DESCRIPTION

Figure 1:
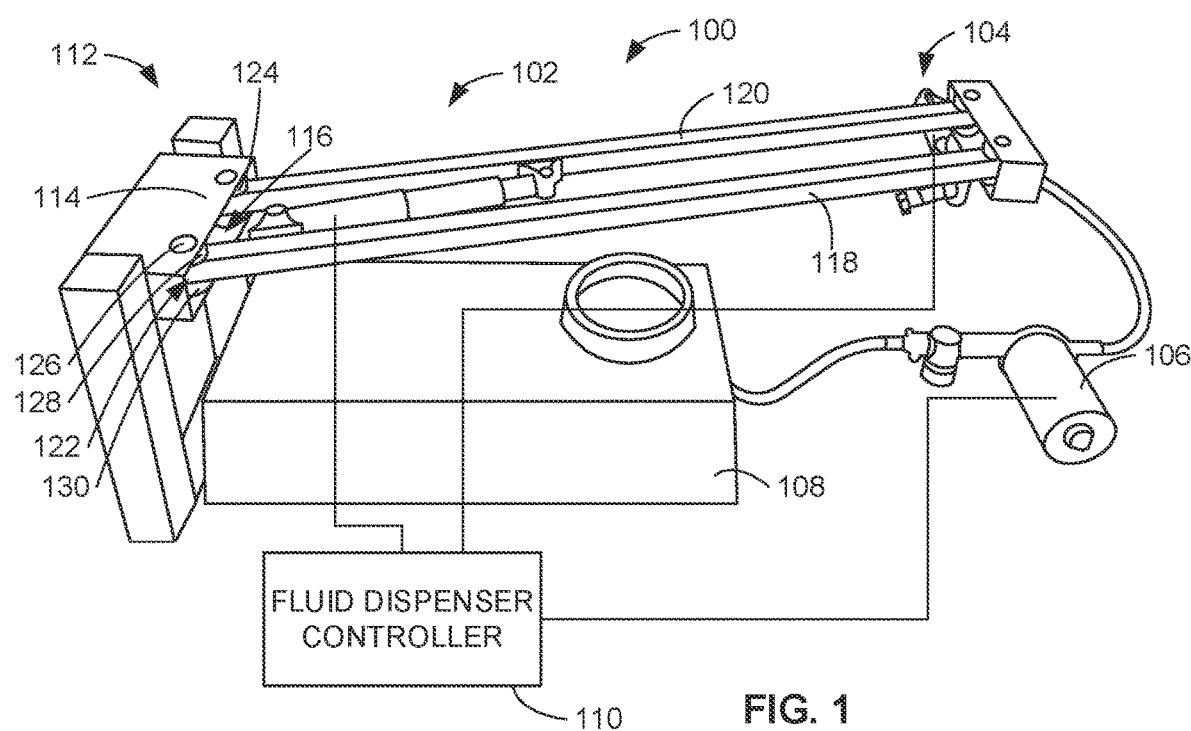
FIG. 1 is a perspective view of example base components of an example self-aligning liquid coupler system that can be implemented in connection with the teachings of this disclosure.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Aerial vehicles may be used in the aerial application of fluid fertilizer and/or pesticides (e.g., herbicides, insecticides, etc.) onto crops. While fixed-wing aircraft have been used to distribute fluid pesticides, in recent years, rotorcraft have increasingly been used in place of fixed-wing aircraft because of rotorcraft's increased maneuverability compared to fixed-wing aircraft in aerial application. For example, rotorcraft allow aerial application of materials in geographic locations (e.g., fields, farms) that are small in size and/or contain, for example, aerial obstacles such as wind turbines and/or severely unlevel land.

Unmanned aerial vehicles (UAVs) are increasingly being considered for use in aerial application. Many of the UAV's used in aerial application across the world are remotely controlled by an operator. Thus, in these instances, though the operator can conduct the aerial application remotely from a position of relative safety and comfort, the constant attention of a human is required throughout the scope of aerial application. Some UAVs such as quadrotor rotorcraft (e.g., quadcopters) used in agriculture operate largely autonomously. These autonomous UAVs are often much smaller than their manned and/or non-autonomous counterparts (e.g., manned aerial vehicles, non-autonomous UAVs) in part due to the extensive cost and regulation associated with autonomous UAVs.

Autonomous UAVs typically have much smaller fluid payloads compared to manned aerial vehicles and thus require refilling of their fluid stores (e.g. of fluid fertilizer or pesticide) and/or fuel stores at relatively shorter intervals. Additionally, a human is required to refill the fluid stores and/or fuel stores of agricultural autonomous UAVs. This is especially inconvenient and cumbersome as a human is not required for the autonomous aerial application.

Disclosed herein are self-aligning liquid coupler systems to couple with, and subsequently refill or refuel autonomous UAVs. Some self-aligning liquid coupler systems disclosed herein include self-aligning liquid dispensing features (e.g., base components) of a coupler system along with vehicle components of a coupler system to create a closed fluid connection to transmit fluid to a vehicle. Though the examples disclosed herein are particularly advantageous to autonomous UAVs, these examples are also useful to non-autonomous UAVs or manned aerial vehicles. For example, the examples disclosed herein may allow the operator of a manned aerial vehicle to refuel without leaving a cockpit. For example, the examples disclosed herein may allow a remote operator of a non-autonomous UAV to operate the UAV from a considerable geographic distance from the UAV as manual refilling of liquid or fuel stores is not necessary. Additionally, the examples disclosed herein could be useful to any vehicle or apparatus that requires fluid transmission.

With regards to autonomous and non-autonomous UAVs, the precision in landing location is not sufficient for aligning components for fluid distribution simply by extending the components towards a UAV. The examples disclosed herein describe self-aligning liquid coupler systems that may account for deviations in the position of a UAV from an expected position in three dimensions and thus further ease fluid distribution processes.

FIG. 1 is a perspective view of example base components 100 of an example self-aligning liquid coupler system that can be implemented in connection with the teachings of this disclosure. The example base components 100 include an example actuating arm 102, an example nozzle assembly 104, an example pump 106, an example fluid reservoir 108, and an example fluid dispenser controller 110. The actuating arm 102 can be actuated to translate the nozzle assembly 104 towards and away from an example vehicle (e.g., an autonomous UAV) containing corresponding (e.g., reciprocal) vehicle components of the self-aligning liquid coupler system. The pump 106 can be actuated to pump fluid from the example fluid reservoir 108 towards the example nozzle assembly 104. In some examples, the fluid dispenser controller 110 implements machine-readable instructions to, based on sensor readings, actuate the pump 106 and the actuating arm 102 to translate the nozzle assembly 104 towards a vehicle such as a quadrotor helicopter, also referred to herein as a quadcopter.

In the illustrated example of FIG. 1, the actuating arm 102 includes a support structure 112 that is rigidly fixed in place. In some examples, the support structure 112 extends to the ground or is rigidly coupled to further structural components extending to the ground (e.g., a table, a platform, a quadcopter storage structure, etc.). For example, the support structure 112 may move slightly due to geological movement, wind, the landing of a vehicle, etc. In the illustrated example of FIG. 1, the support structure 112 is rigidly coupled to a stationary member 114. For example, the stationary member 114 can move slightly due to geological movement, wind, the landing of a vehicle, etc. In this example, the stationary member 114 has an aperture 116 extending therethrough. In this example, the actuating arm 102 also includes an example first arm member 118 and an example second arm member 120. In some examples, the first arm member 118 and the second arm member 120 have substantially the same length and substantially the same geometrical and dimensional properties. As used herein, "substantially the same" means the same or almost the same due to, for example, manufacturing tolerances.

In the illustrated example of FIG. 1, the first arm member 118 is rotatably coupled to the support structure 112 via a first pin joint 122 (e.g., a revolute joint, a pinned connection, etc.) with the stationary member 114, restricting the first arm member 118 to one degree of freedom. In FIG. 1, the stationary member 114 is substantially perpendicular to the support structure 112. In FIG. 1, the second arm member 120 is rotatably coupled to the support structure 112 via a second pin joint 124 with the stationary member 114. In FIG. 1, the first pin joint 122 contains a pin 126 to be received by a first bore of the first arm member 118. In FIG. 1, the first arm member 118 is suspended apart from the support structure 112 by a first spacer 128 and a second spacer 130 disposed respectively vertically above and below the first arm member 118 within the aperture 116. In the illustrated example of FIG. 1, the second pin joint 124 has substantially the same components as the first pin joint 122. In the example of FIG. 1, the support structure 112 is a vertical structure and the first arm member 118 and the second arm member 120 are substantially perpendicular to the support structure 112. As such, the first arm member 118 and the second arm member 120 rotate in a plane that is substantially parallel to the ground. As used herein, "substantially parallel" means parallel or within 20° of parallel. As used herein, "substantially perpendicular" means perpendicular or within 20° of perpendicular.

Figure 2:
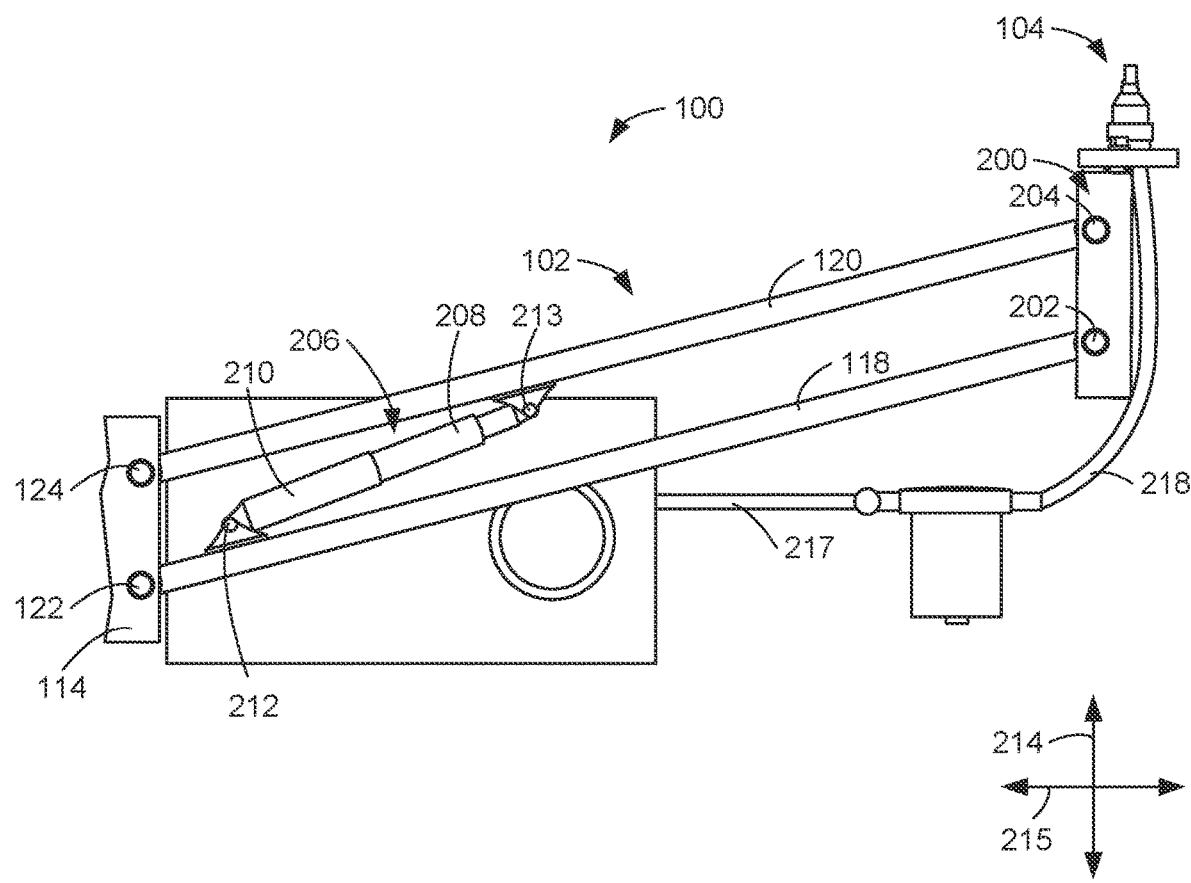
FIG. 2 is a top view of the example base components of FIG. 1.

FIG. 2 is a top view of the example base components 100 of FIG. 1. The example actuating arm 102 also includes a translating member 200 (e.g., a structure) coupled to the first arm member 118 (FIG. 1) via an example third pin joint 202 and coupled to the second arm member 120 (FIG. 1) via a fourth pin joint 204. In the example of FIG. 2, the third pin joint 202 and the fourth pin joint 204 are substantially the same as the first pin joint 122 and the second pin joint 124 (both of FIG. 1). In the example of FIG. 2, the first pin joint 122 and the second pin joint 124 are spaced apart at substantially the same distance as the third pin joint 202 and the fourth pin joint 204 are spaced apart. The stationary member 114 (FIG. 1), the first arm member 118, the second arm member 120, and the translating member 200 together form a parallelogram linkage (e.g., a four-bar linkage with two sets of two equal length members). In this configuration, the translating member 200 (e.g., the coupler member of the four-bar linkage) can translate according to output curves formed by the rotation of the first arm member 118 at the position of the third pin joint 202 and the second arm member 120 at the position of the fourth pin joint 204. Accordingly, the translating member 200 can translate relative to the stationary member 114 and/or the support structure 112 (FIG. 1) without rotating relative to the stationary member 114 and/or support structure 112. In other examples in accordance with the teachings of this disclosure, the translating member 200 can rotate relative to the stationary member 114 and/or the support structure 112.

In the illustrated example of FIG. 2, the actuating arm 102 is actuated by an extension of an example linear actuator 206. In some examples, the linear actuator 206, upon receipt of a command (e.g., via one or more wired or wireless connections, one or more communications protocols, etc.) from the fluid dispenser controller 110, extends or retracts an example inner tube 208 relative to an example outer tube 210. Additionally or alternatively, the linear actuator 206 can be electric linear actuator driven by a lead and/or ball screw, a belt drive linear actuator, hydraulic linear actuator, pneumatic linear actuator, and/or any other suitable type of linear actuator. In the example of FIG. 2, the outer tube 210 of the linear actuator 206 is coupled to the first arm member 118 via an example fifth pin joint 212. In this example, the inner tube 208 of the linear actuator 206 is coupled to the second arm member 120 via an example sixth pin joint 213. In this example, the fifth pin joint 212 is a first distance from the first pin joint 122 and the sixth pin joint 213 is at a second distance longer than the first distance from the second pin joint 124.

In the illustrated example of FIG. 2, the linear actuator 206 extends and retracts in a plane coincident with or substantially parallel to a plane defined by the first arm member 118 and the second arm member 120. In this manner, the extension or retraction of the inner tube 208 relative to the outer tube 210 drives the parallelogram linkage, rotating the first arm member 118 and the second arm member 120 and translating the translating member 200. In the illustrated example of FIG. 1, the lengths of the first arm member 118 and the second arm member 120 are significantly longer than the distance between (a) first and second pin joints 122, 124 and (b) the third and fourth pin joints 202, 204. In consequence, when the linear actuator 206 extends or retracts, the translating member 200 translates significantly further in the direction parallel to support structure (e.g., along a first axis 214) than the translating member 200 translates in the direction perpendicular to the support structure (e.g. along a second axis 215).

The example of FIG. 2 also shows the nozzle assembly 104 rigidly coupled to the translating member 200 of the actuating arm 102. In the example of FIG. 2, the nozzle assembly 104 extends from the translating member 200 in a direction substantially parallel to the translating member 200 (e.g., positive or upwards on the page along the first axis 214). In this example, the nozzle assembly 104 is positioned such that it leads the translating member 200 when the linear actuator 206 is extended to drive the translating member forward (e.g., positive or upwards on the page along the first axis 214). As such, the nozzle assembly 104 trails the translating member 200 when the linear actuator 206 is retracted.

In the illustrated example of FIG. 2, the pump 106 can be actuated to pump fluid from the fluid reservoir 108 through a first channel 217 (e.g., a fluid channel, a duct, a first section of tubing, etc.) and subsequently a second channel 218 (e.g., a fluid channel, a duct, a second section of tubing, etc.) to the nozzle assembly 104. In this example, the second channel 218 is composed of flexible tubing such that fluid can be pumped through the second channel 218 despite the position of the nozzle assembly 104 relative to the pump 106 (e.g., the extension or retraction of the actuating arm 102). The pump 106 can be any pump sufficient to pump fluid to the nozzle assembly 104 from the fluid reservoir 108, such as a positive displacement pump (e.g., a gear pump, a vane pump, etc.).

In some examples, the fluid dispenser controller 110 is communicatively coupled to aspects of the linear actuator 206, the nozzle assembly 104, the pump 106, and an example vehicle or vehicle sensor. In some examples, upon receiving a signal that an example vehicle has arrived (e.g., via a sensor indicating the vehicle has arrived), the fluid dispenser controller 110 actuates the linear actuator 206 to move the arm 102 towards an example vehicle. In some examples, a contact sensor is coupled to the nozzle assembly 104. In these examples, the contact sensor indicates to the fluid dispenser controller 110 that the nozzle assembly 104 is aligned with a reciprocal portion of the vehicle (e.g., vehicle components). In some examples, the fluid dispenser controller 110 then actuates the pump 106 to pump a quantity of fluid from the fluid reservoir 108.

Figure 3:
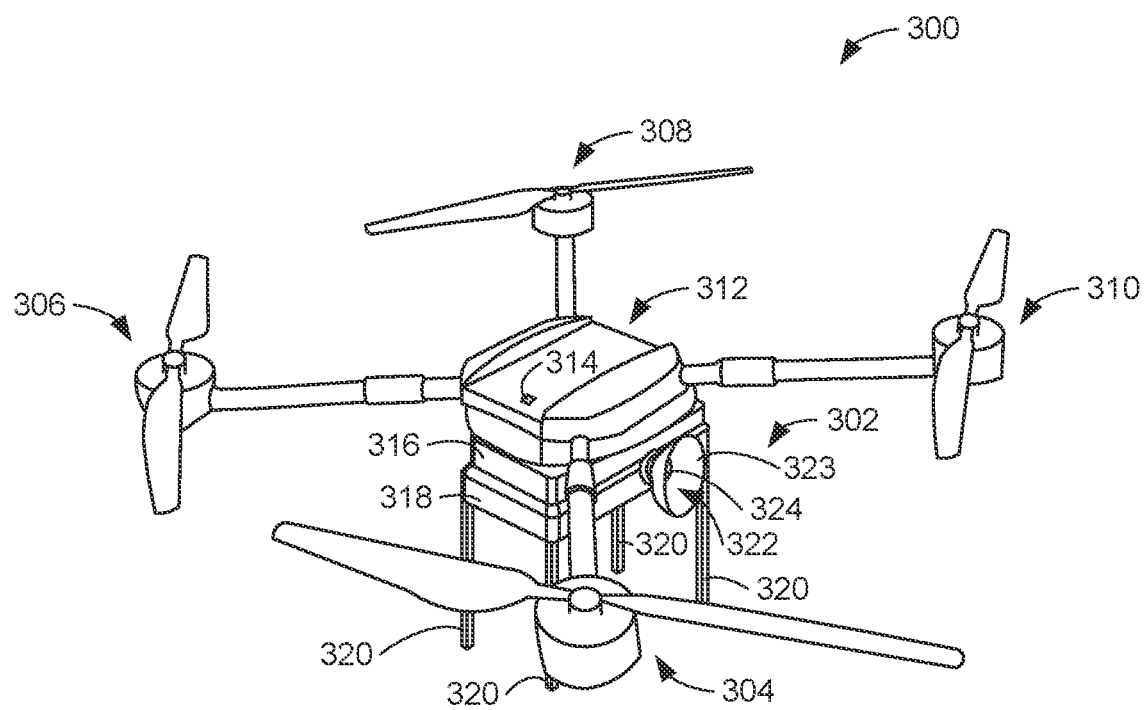
FIG. 3 is a perspective view of an example rotorcraft containing example vehicle components of the self-aligning liquid coupler system that can be implemented in connection with the base components of FIG. 1.

FIG. 3 is a perspective view of an example rotorcraft 300 containing example vehicle components 302 of the self-aligning liquid coupler system that can be implemented in connection with the base components of FIG. 1. In this example, the rotorcraft 300 is a quadrotor helicopter (e.g., a quadcopter). Additionally or alternatively, another vehicle (e.g., aircraft, rotorcraft, etc.) can be implemented in accordance with the teachings of this disclosure. The vehicle components 302 are denoted as such because they are coupled to the example rotorcraft 300 during its operation. In the illustrated example of FIG. 3, the rotorcraft 300 includes example first, second, third, and fourth propeller assemblies 304, 306, 308, 310 spaced apart from one another and from a central body 312. In some examples, the propeller assemblies 304-310 can be driven by internal motors (e.g., brushless DC motors).

In the example of FIG. 3, the central body 312 of the rotorcraft 300 may internally contain such aspects as a flight controller, motor controller such as an electronic speed controller (ESC), power distribution board (PDB), global positioning system (GPS) module, inertial measurement unit (IMU), and/or other onboard processors and modules. In this example, the central body 312 includes an example communications module 314. In this example, the communications module 314 is capable of receiving and sending radio frequency (RF) signals and is be communicatively coupled to a flight controller. In this example, the central body 312 also includes an example battery 316 (e.g., a removable battery, a swappable battery etc.), an example onboard fluid storage tank 318, and example fixed landing gear 320.

In the illustrated example of FIG. 3, the body 312 of the rotorcraft 300 also includes an example fluid inlet assembly 322. In FIG. 3, fluid inlet assembly 322 includes an example funnel portion 323 and an example first opening 324 (e.g., an opening, a central opening, a fluid inlet, a fuel inlet, a pesticide inlet, etc.). In FIG. 3, the funnel portion 323 includes a conical taper converging towards the first opening 324. In some examples, the fluid inlet assembly 322 extends from body 312 in a direction substantially parallel to the ground (e.g., parallel or within 20° of parallel) and/or substantially horizontal (e.g., horizontal or within 20° of horizontal). In some examples, the first opening 324 is fluidly coupled to the fluid storage tank 318 (e.g., the first opening 324 is an inlet to the fluid storage tank 318).

Figure 4A:
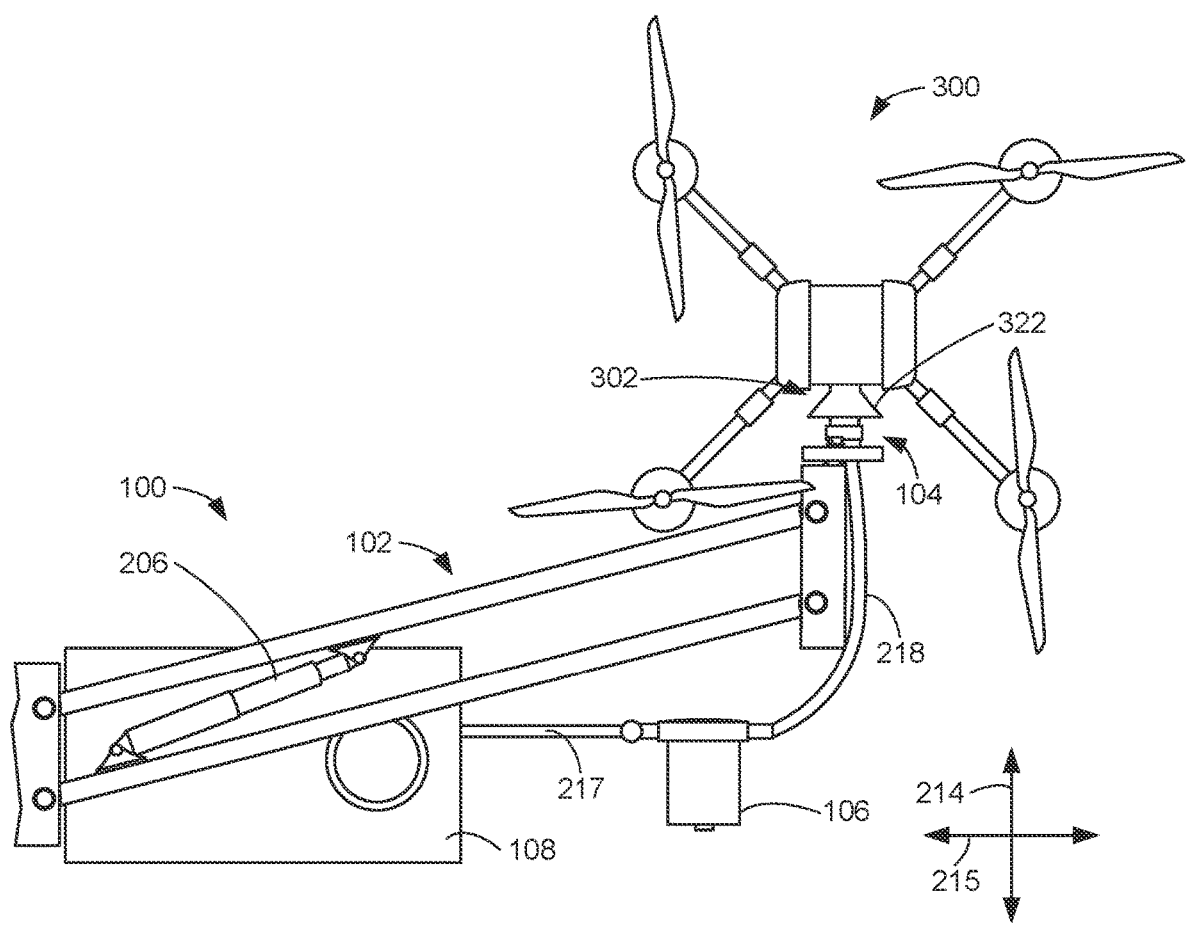
FIG. 4A is a top view of the example base components of FIG. 1 coupled to the example vehicle components of the example rotorcraft of FIG. 3.

FIG. 4A is a top view of the example base components 100 of FIG. 1 coupled to the example vehicle components 302 of the example rotorcraft 300 of FIG. 3. In FIG. 4A, the actuating arm 102 of FIG. 1 is in a first position relative to the rotorcraft 300. In the illustrated example of FIG. 4A, the nozzle assembly 104 of FIG. 1 is received by fluid inlet assembly 322 of FIG. 3, such that the fluid dispenser controller 110 (FIG. 1) can pump a fluid to the fluid storage tank 318 (FIG. 3) of the rotorcraft 300 via the second channel 218 (FIG. 2), the pump 106, the first channel 217, and the fluid reservoir 108 (All of FIG. 1). Coupling (e.g., self-aligning coupling) between the nozzle assembly 104 and the fluid inlet assembly 322 is discussed in greater detail in connection with FIGS. 5-10.

Figure 4B:
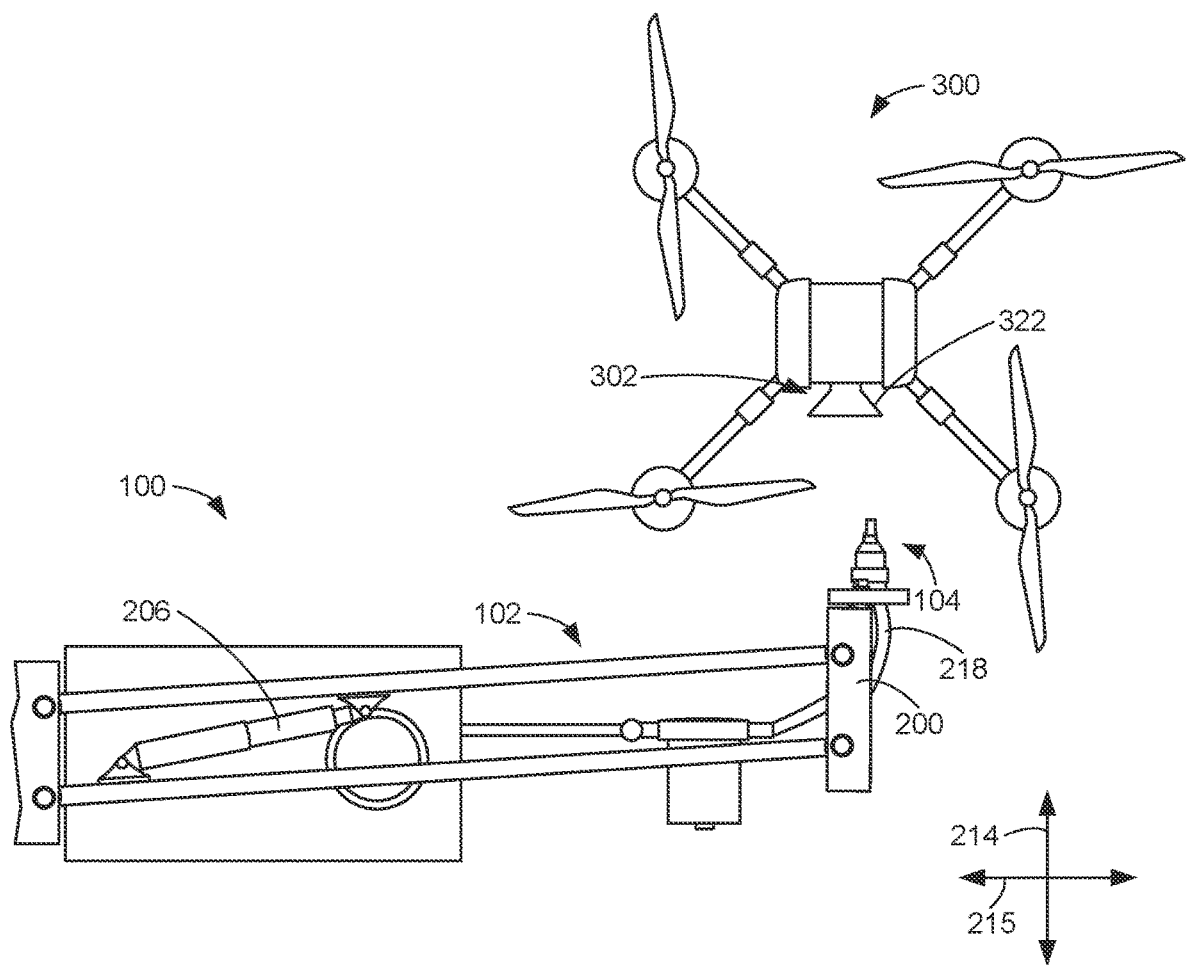
FIG. 4B is a top view of the example base components of FIG. 1 not coupled to the example vehicle components of the example rotorcraft of FIG. 3.

FIG. 4B is a top view of the example base components 100 of FIG. 1 not coupled to the example vehicle components 302 of the example rotorcraft 300 of FIG. 3. In FIG. 4B, the actuating arm 102 is in a second position (e.g., a retracted position) different from the first position of FIG. 4A. In FIG. 4B, the linear actuator 206 (FIG. 2) is retracted relative to the position of the linear actuator 206 in FIG. 4A. Accordingly, the actuating arm 102 is retracted (e.g., moved clockwise) from the rotorcraft 300 relative to the position of the actuating arm 102 in FIG. 4A. In FIG. 4B, the nozzle assembly 104 and the translating member 200 (FIG. 2) are shifted relative to the positions of the nozzle assembly 104 and the translating member 200 in FIG. 4A, while the rotorcraft 300 remains in the same position as in FIG. 4A. In some examples, the channel 218 (e.g., the flexible tubing) is provided with enough slack to remain coupled to the nozzle assembly 104 in both the first position of FIG. 4A and the second position of FIG. 4B. In some examples, the rotorcraft 300 and the base components 100 are oriented in the position of FIG. 4B when the rotorcraft 300 is not being fueled. In some examples, the fluid dispenser controller 110 (FIG. 1) actuates the linear actuator 206 to initiate a filling event of the rotorcraft 300. In some of these examples, the fluid dispenser controller 110 can actuate the linear actuator 206 to extend to cause the actuating arm 102 to move until the base components 100 are in the first position of FIG. 4A or coupled with the vehicle components 302.

Figure 5:
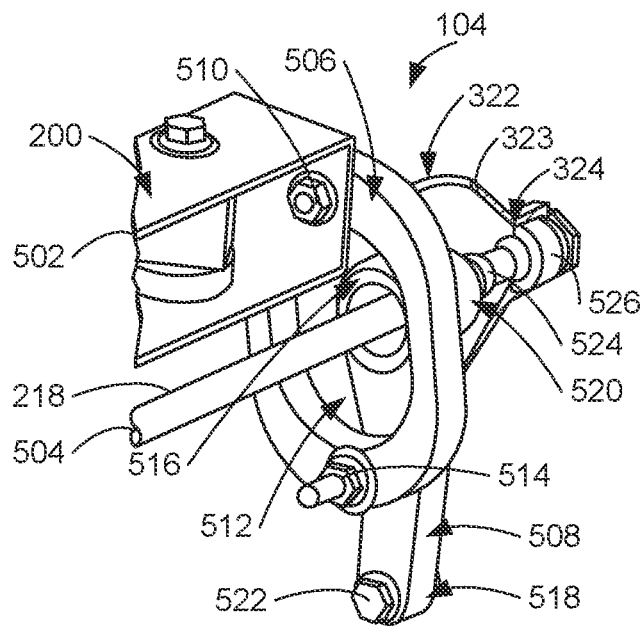
FIG. 5 is a perspective enlarged view including a partial cross section of the example base components of FIG. 1 and the example vehicle components of FIG. 3 including an example nozzle assembly and an example fluid inlet.

FIG. 5 is a perspective enlarged view including a partial cross section of the base components 100 of FIG. 1 and the vehicle components 302 of FIG. 3 including the nozzle assembly 104 of FIG. 1 and the fluid inlet assembly 322 of FIG. 3. In the illustrated example of FIG. 5, the translating member 200 of FIG. 2 is broken at a first break line 502 and the second channel 218 of FIG. 2 is broken at a second break line 504. In FIG. 5, the rotorcraft 300 (FIG. 3) is removed from view along with accompanying aspects of the vehicle components such as the fluid storage tank 318 (FIG. 3). In FIG. 5, the funnel portion 323 (FIG. 3) of the fluid inlet assembly 322 is cross sectioned. In the illustrated example of FIG. 5, the nozzle assembly 104 includes an example first link 506 and an example second link 508. In this example, the first link 506 is a rigid member and is coupled to the translating member 200 (FIG. 2) (e.g., coupled to a base, coupled to a structure, etc.) via an example seventh pin joint 510 (e.g., a revolute joint, a pinned connection, etc.). In some examples, the seventh pin joint 510 is implemented by a rod at least partially encased in a bearing element (e.g., a rolling-element bearing). In the illustrated example of FIG. 5, the first link 506 includes an example second opening 512. In this example, the second channel 218 is restricted (e.g., retained, enclosed, etc.) by the second opening 512 so as to guide the second channel 218 during movement of the actuation arm 102. Accordingly, due to the second opening 512 of the first link 506, the second channel 218 is advantageously prevented from becoming or otherwise less likely to become entangled with aspects of the nozzle assembly 104 and/or the rotorcraft 300 such as, for example, the second link 508.

In the example of FIG. 5, the second link 508 is coupled to the first link 506 via an example eighth pin joint 514 opposite the translating member 200 (e.g., opposite the base, opposite the structure, etc.). In some examples, the eighth pin joint 514 is implemented by a rod at least partially encased in a bearing element. In the illustrated example of FIG. 5, the second link 508 includes an example first end 516 and an example second end 518. In this example, an example nozzle head 520 is disposed on the first end 516 of the second link 508. The nozzle head 520 is fluidly coupled to the second channel 218. In FIG. 5, an example counterweight 522 (e.g., a weight) is disposed on the second end 518 of the second link 508 and is heavier than the nozzle head 520. In the illustrated example of FIG. 5, the eighth pin joint 514 is coupled to the second link 508 at a position between the first end 516 and the second end 518 of the second link 508. In this arrangement, the counterweight 522 is urged to the vertically lowest possible position relative to the translating member 200 by way of gravitational force. In this manner, when no external force is applied to the nozzle assembly 104, the nozzle head 520 is disposed in a position relatively vertically above counterweight 522.

In the illustrated example of FIG. 5, the nozzle head 520 includes example first valve components 524 (e.g., nozzle-side valve components). In FIG. 5, the fluid inlet assembly 322 (FIG. 3) also includes example second valve components 526 (e.g., inlet-side valve components) disposed in the first opening 324 (FIG. 3) to interface (e.g., to fluidly couple) with the first valve components 524. In some examples, the first valve components 524 prevent fluid in second channel 218 from exiting the nozzle head 520 when the first valve components 524 are not in a locking interface with the second valve components 526. The first and second valve components 524, 526 can be pop-up valve components, check valve components, poppet valve components etc. In some examples, the second valve components 526 prevent fluid from exiting the fluid storage tank 318 (e.g., a backflow condition) when the second valve components 526 are not in a locking interface with the first valve components 524. In some examples, when a locking interface is established between the first valve components 524 and the second valve components 526, the second channel 218 is fluidly coupled to the fluid storage tank 318. As used herein, a "locking interface" refers to a reversible condition (e.g., reversible by movement of the actuating arm 102) wherein the first valve components 524 mate with the second valve components 526.

Figure 6:
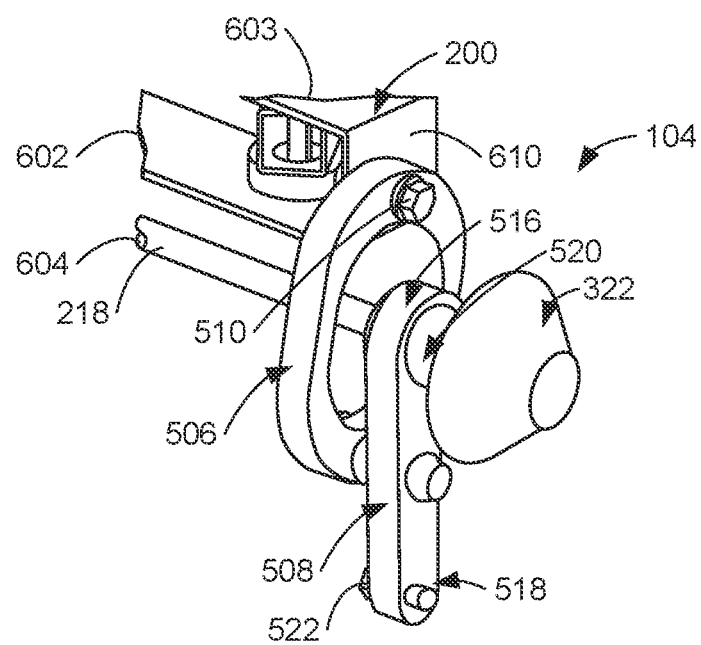
FIG. 6 is another perspective enlarged view of the example nozzle assembly and the example fluid inlet of FIG. 3.

FIG. 6 is another perspective enlarged view of the nozzle assembly 104 of FIG. 1 and the fluid inlet assembly 322 of FIG. 3. In the illustrated example of FIG. 6, the translating member 200 (FIG. 2) is broken at a fourth break line 602 and at a fifth break line 603. The second channel 218 (FIG. 2) is broken at a sixth break line 604. In FIG. 6, the translating member 200 includes an example first face 610. In FIG. 6, the first face 610 is substantially perpendicular to the ground (e.g., perpendicular to the ground or within 20° of perpendicular). In FIG. 6, the first link 506 (FIG. 5) is substantially parallel to the first face 610 (e.g., the plane defined by the length of the first link 506 is substantially parallel to the plane defined by the first face 610) and the second link 508

(FIG. 5) is substantially parallel to the first link 506 and the first face 610 (e.g., parallel or within 20 degrees of parallel). In FIG. 6, the first link 506 is offset from (e.g., projected away from) the first face 610 in a direction substantially perpendicular to the first face 610. Similarly, in the example of FIG. 6, the second link 508 is offset from the first link 506 in the same direction (e.g., perpendicular to the first face 610). Accordingly, In FIG. 6, the first link 506 can rotate freely about the seventh pin joint 510 (FIG. 5) relative to the translating member 200 and the second link 508 can rotate freely about the eighth pin joint 514 (FIG. 5) relative to the first link 506.

In the illustrated example of FIG. 6, due to the free rotation of the first and second links 506, 508 about the seventh and eighth pin joints 510, 514, the nozzle head 520 (FIG. 5) can move according to a range of motion defined by the first and second links 506, 508 due to externally applied forces to the nozzle head 520. In some examples, the rotorcraft 300 of FIG. 3 lands at different positions on a fixed platform relative to the base components 100 (FIG. 1). In some examples, the rotorcraft 300 lands at a different position on a platform at each landing instance (e.g., lands at many different positions on the platform). In many of these examples, the nozzle head 520 does not directly aligned with the fluid inlet assembly 322 when the nozzle head 520 is in a resting state. In some examples, the nozzle head 520 first interfaces with the funnel portion 323 of the fluid inlet assembly 322 (e.g., a position on the on the face of the funnel portion 323 away from the first opening 324) when the actuating arm 102 (FIG. 2) is rotated towards the rotorcraft 300 and the translating member 200 moves towards the rotorcraft 300. Since the first end 516 including the nozzle head 520 can move freely with reciprocal movement of the second end 518, the nozzle head 520 is urged by the contour of the funnel portion 323 towards the first opening 324 (FIG. 3) (e.g., urged by the conical taper of the funnel portion 323 that converges towards the first opening 324) with the forward movement of the translating member 200 until a locking condition is established by the first and second valve components 524, 526 (both of FIG. 5). In some examples, the movement of the nozzle head 520 towards the first opening 324 accommodates any misalignment between the nozzle head 520 and the first opening 324. In some examples, when the locking connection is established, the counterweight 522 will come to rest at a position vertically higher than its normal and/or resting position (e.g., the position of the counterweight 522 when no external forces are incident on the nozzle assembly 104). In some examples, when the translating member 200 is retracted (e.g., by retraction of the actuating arm 102), the counterweight 522 moves downward to alleviate gravitational potential energy and urges first end 516 and nozzle head 520 into their normal and/or resting positions (e.g., positions prior to the nozzle head 520 interfacing fluid inlet assembly 322). Example self-aligning liquid coupler systems disclosed herein advantageously accommodate unpredictable misalignment between a nozzle and a fluid inlet (e.g., an opening of a fluid inlet, etc.). Examples disclosed herein can automatically refill the fluid storage of rotorcraft 300 despite an unplanned misalignment between a fluid inlet of the rotorcraft and a refilling nozzle.

Figure 7:
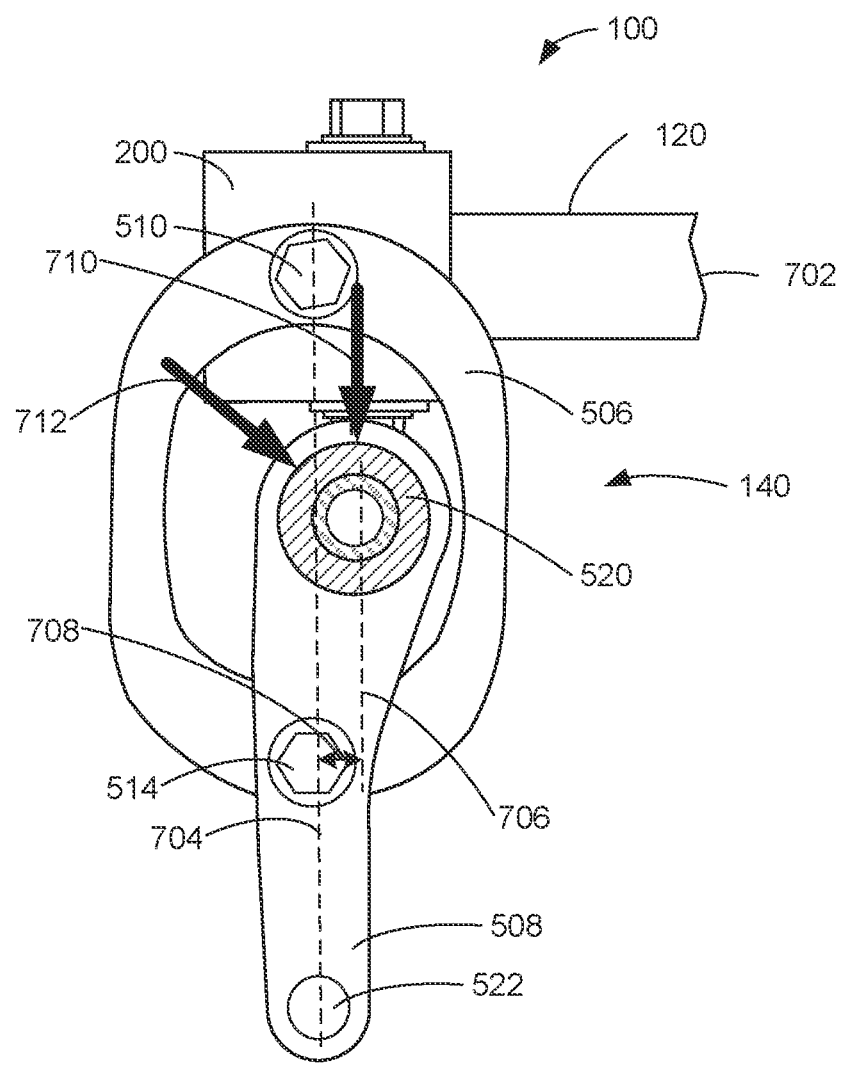
FIG. 7 is a back view and partial cross section of the example base components of FIG. 1.

FIG. 7 is a back view and partial cross section of the base components 100 of FIG. 1. In the illustrated example of FIG. 7, the second arm member 120 (FIG. 1) is broken at seventh break line 702 and the nozzle head 520 (FIG. 5) is cross sectioned. In FIG. 7, a first broken line 704 describes the alignment of the counterweight 522, the seventh pin joint 510, and the eighth pin joint 514 along the first and second links 506, 508 (all of FIG. 5). A second broken line 706 parallel to the first broken line 704 travels through the center of the nozzle head 520. In FIG. 7, the second link 508 is nonlinear, such that the nozzle head 520 is offset from the counterweight 522 at a first distance 708. In some examples disclosed herein, the first distance is 10 mm. In some examples disclosed herein, the first distance is between 5 and 15 mm. For example, the counterweight 522 causes the nozzle head 520 to come to a rest approximately 10 millimeters horizontally displaced from the weight.

In illustrated example of FIG. 7, the first distance 708 reduces the propensity of the mechanism formed by the translating member 200 (FIG. 2), the first link 506 (FIG. 5), and the second link 508 to bind during the movement of the translating member 200. In some examples, due to the position of fluid inlet assembly 322 (FIG. 3) of the rotorcraft 300 relative to the nozzle head 520, the nozzle head 520 interfaces with the funnel portion 323 (FIG. 3) directly vertically above the first opening 324 during extension of the actuating arm 102 and translation of the translating member 200. In these examples, a first force 710 is generated on the nozzle head 520 when the nozzle head 520 interfaces with the fluid inlet assembly 322 during translation of the translating member 200 towards an example vehicle. For example, in the absence of the first distance 708 (e.g., wherein the first distance 708 is 0 millimeters), the first force 710 would be transmitted axially through both the first link 506 and the second link 508. In this example, due to the absence of the first distance 708, no lever arm relative to the seventh pin joint 510 or the eighth pin joint 514 would exist to urge the nozzle head 520 towards an opening such as the first opening 324 of FIG. 3. Rather, in this example, as the translating member 200 moves towards an example vehicle, the first force 710 increases without inducing movement in the first link 506 or the second link 508 and increases static friction between the nozzle head 520 and the funnel portion 323, causing a binding condition that prevents and/or otherwise reduces movement of the base components 100.

In the illustrated example of FIG. 7, in the event the first distance 708 is a non-zero value (e.g., 10 millimeters) and the first force 710 is applied to the nozzle head 520 (e.g., because the first opening 324 of the fluid inlet assembly 322 is directly below the nozzle head 520), a lever arm (e.g., a vertical lever arm) is created relative to the eighth pin joint 514. In this example, as the first force 710 increases (e.g., as the translating member 200 moves towards an example vehicle), a torque is applied relative to the eighth pin joint 514 which urges the nozzle head 520 toward first opening 324 of FIG. 3. The nozzle head 520 can travel linearly in the direction of the first force 710 because of the linkage formed by the first link 506, the second link 508, the seventh pin joint 510, and the eighth pin joint 514. Because of the first distance 708, there is no angle that the first force 710 can be applied relative to the nozzle head 520 that would result in direct axial force transmission through both the first link 506 and the second link 508 at the resting condition. Direct axial force transmission through the second link 508 refers to force transmission through the second link 508 on the axis containing the nozzle head 520 and the eighth pin joint 514. Direct axial force transmission through the first link 506 refers to force transmission through the first link 506 the axis containing the seventh pin joint 510 and the eighth pin joint 514.

In some examples, the nozzle head 520 will interface the funnel portion 323 at a position other than vertically above first opening 324. For example, if the nozzle head interfaces the funnel portion 323 at a position relatively to the left on the page in the view of FIG. 7, an example second force 712 is generated on the nozzle head. The second force 712 is perpendicularly displaced from the eighth pin joint 514 so as to have a lever arm (e.g., a vertical lever arm) about the eighth pin joint 514 regardless of the existence of the first distance 708. Accordingly, in this example, as the translating member 200 moves towards the rotorcraft 300, the nozzle head 520 is urged towards the center of the first opening 324 (e.g., a central opening).

Figure 8:
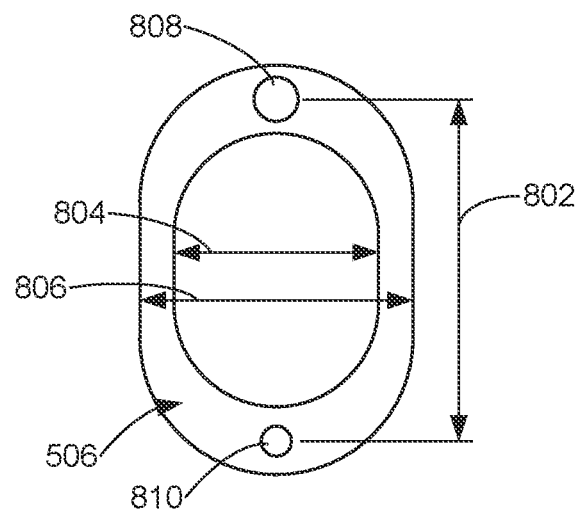
FIG. 8 is a back view of an example first link of FIG. 7.

FIG. 8 is a back view of an example first link 506 of FIG. 5. The first link 506 includes an example first dimension 802, an example second dimension 804, and an example third dimension 805. In some examples, the first dimension 802 is 100 mm, the second dimension 804 is 60 mm, and the third dimension 806 is 80 mm. An example first bore 808 can be implemented in connection with the seventh pin joint 510 (FIG. 5) and an example second bore 810 can be implemented in connection the eighth pin joint 514 (FIG. 5). In some examples, the first bore 808 has a diameter of 13 mm and the second bore 810 has a diameter of 9 mm. In some examples the first link 506 (FIG. 5) and the second link 508 have a thickness of 15 mm. In some examples, the dimensions 802, 804, 806, the bores 808, 810, and the thicknesses of the first and second links 506, 508 are manufactured within a tolerance of the stated dimension (e.g., a tolerance of ±2 mm, a tolerance of ±4 mm, a tolerance of ±1 mm, a tolerance of ±0.01 mm, etc.). While dimensions provide one example, other dimensions and dimensional relationships may be utilized.

Figure 9:
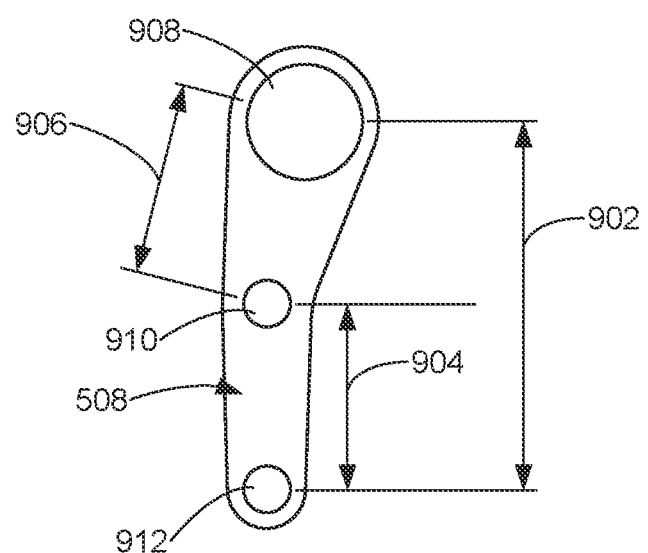
FIG. 9 is a back view of an example second link of FIG. 7.

FIG. 9 is a back view of an example second link 508 of FIG. 5. The second link 508 includes an example fourth dimension 902, an example fifth dimension 904, and an example sixth dimension 906. In some examples, the fourth dimension 902 is 99 mm, the fifth dimension 904 is 50 mm, and the sixth dimension 906 is 50 mm. An example third bore 908 can be implemented in connection with the nozzle head 520 (FIG. 5), an example fourth bore 910 can be implemented in connection the eighth pin joint 514 (FIG. 5), and an example fifth bore 912 can be implemented in connection with the counterweight 522. In some examples, the third bore 908 has a diameter of 31 mm, the fourth bore 910 has a diameter of 9 mm, and the fifth bore 912 has a diameter of 13 mm. In some examples, the dimensions 902, 904, 906 and the bores 908, 910, 912 are manufactured within a tolerance of the stated dimension (e.g., a tolerance of ±2 mm, a tolerance of ±4 mm, a tolerance of ±1 mm, a tolerance of ±0.01 mm, etc.). While dimensions are shown to provide one example, other dimensions and dimensional relationships may be utilized.

Figure 10:
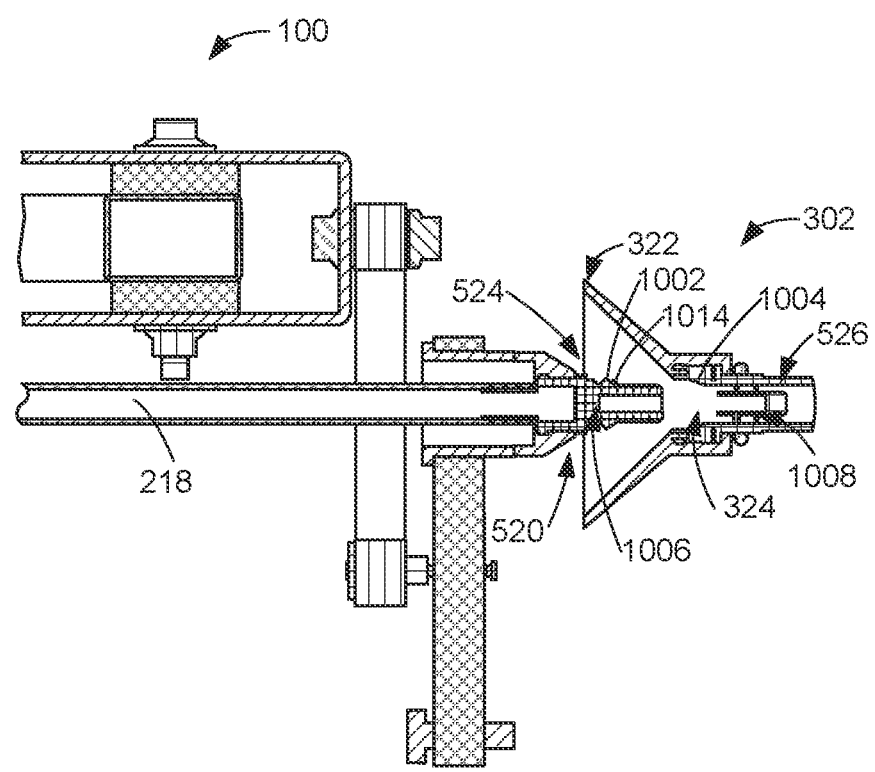
FIG. 10 is an enlarged partial cross section of the base components of FIG. 1 and the vehicle components of FIG. 3 including the nozzle assembly.

FIG. 10 is an enlarged partial cross section of the base components 100 of FIG. 1 and the vehicle components 302 of FIG. 3 including the nozzle head 520 of FIG. 5. The cross section of FIG. 10 is taken vertically bisecting the fluid inlet assembly 322 (FIG. 3) and the nozzle head 520. In the illustrated example of FIG. 10, the first valve components 524 and second valve components 526 (both of FIG. 5) are not in a locking connection. In FIG. 10, the nozzle head 520 is aligned with the first opening 324 (FIG. 3). The first valve components 524 include an example first annular flange 1002. In FIG. 10, the first annular flange 1002 interfaces with an example seat 1004 of the second valve components 526 in the first opening 324 when the nozzle head 520 is fully inserted into the first opening 324. In FIG. 10, the first valve components 524 and second valve components 526 are normally closed (e.g., a normally closed check valve and/or poppet valve, etc.).

In the illustrated example of FIG. 10, when the first valve components 524 are inserted into the first opening 324, first poppet components 1006 are urged against second poppet components 1008 to allow fluid to move from the nozzle head 520. For example, the first valve components 524 include a first spring (not shown) to bias first poppet components 1006 into a closed position and the second valve components 526 include a second spring (not shown) to bias second poppet components 1008 into a closed position. When the first valve components 524 meet the second valve components 526, the interaction of the first poppet components 1006 and the second poppet components 1008 compresses the first and second springs allowing fluid flow from the nozzle head 520 past the second poppet components 1008. In FIG. 10, because of the interactions between the first valve components 524 and the second valve components 526, when the first flange 1002 interfaces with the seat 1004, a fluid connection is formed between the second channel 218 and the fluid storage tank 318 of FIG. 3 (e.g., due to the interaction of the poppet components 1006, 1008). In FIG. 10, a contact sensor 1014 is coupled to the first flange 1002. In some examples, contact sensor 1014 communicates to the fluid dispenser controller 110 that the first flange 1002 has interfaced the seat 1004.

Figure 11:
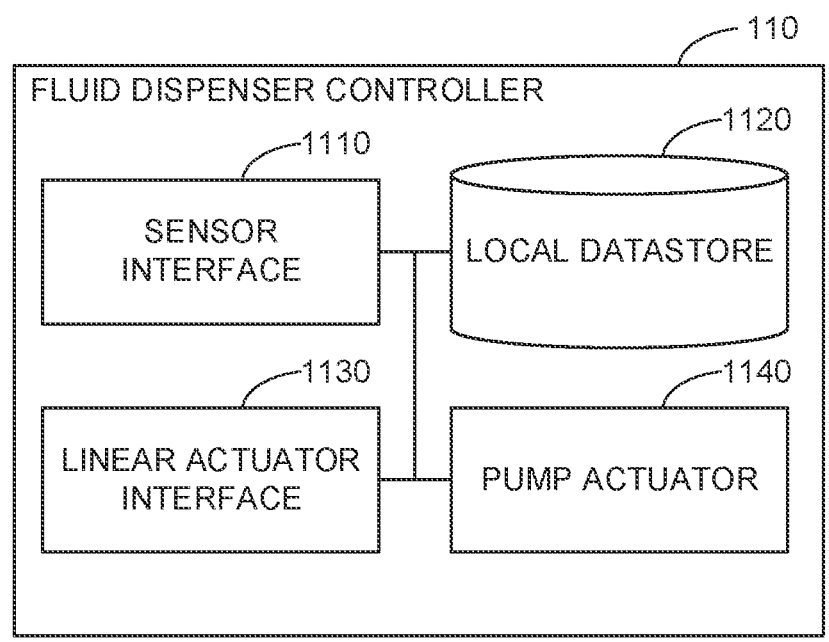
FIG. 11 is a block diagram of an example fluid dispenser controller to actuate the self-aligning liquid coupler system of FIGS. 1-10.

FIG. 11 is a block diagram of the example fluid dispenser controller 110 of FIG. 1 to actuate the self-aligning liquid coupler system of FIGS. 1-9. The fluid dispenser controller 110 includes an example sensor interface 1110, an example local datastore 1120, an example linear actuator interface 1130, and an example pump actuator 1140.

In the illustrated example of FIG. 11, the fluid dispenser controller 110 of FIG. 1 includes the sensor interface 1110 to obtain sensor readings from aspects of a self-aligning liquid coupler system. The example sensor interface 1110 of the illustrated example of FIG. 11 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example sensor interface 1110 receives signals from the contact sensor 1014 of FIG. 10 along with signals from the communications module 314 of the example rotorcraft 300 (both of FIG. 3). In some examples, the sensor interface 1110 indicates to the fluid dispenser controller 110 that the rotorcraft 300 has arrived in range of the base components 100 (e.g., by receiving a signal and/or data from the communications module 314) and indicates to the fluid dispenser controller 110 that the flange 1002 has interfaced the seat 1004 (e.g., by receiving a signal from the contact sensor 1014). However, any other methods may additionally or alternatively be used.

In the illustrated example of FIG. 11, the fluid dispenser controller 110 of FIG. 1 includes the local datastore 1120 to store sensor readings and machine readable instructions to implement the fluid dispenser controller 110. The example local datastore 1120 of the illustrated example of FIG. 11 is implemented by any memory, storage device and/or storage disc for storing data such as, for example, flash memory, magnetic media, optical media, solid state memory, hard drive(s), thumb drive(s), etc. Furthermore, the data stored in the example local datastore 1120 may be in any data format such as, for example, binary data, comma delimited data, tab delimited data, structured query language (SQL) structures, etc. While, in the illustrated example, the example local datastore 1120 is illustrated as a single device, the example local datastore 1120 and/or any other data storage devices described herein may be implemented by any number and/or type(s) of memories. In the illustrated example of FIG. 11, the local datastore 1120 stores sensor readings retrieved by the sensor interface 1110. In FIG. 11, the local datastore 1120 also stores instructions or configuration values to receive signals and/or data from the sensor interface 1110, and in turn to actuate the linear actuator 206 (FIG. 2) via the linear actuator interface 1130 and to actuate the pump 106 (FIG. 1) via the pump actuator 1140.

In the illustrated example of FIG. 11, the fluid dispenser controller 110 of FIG. 1 includes the linear actuator interface 1130 extend and/or retract the linear actuator 206. The example linear actuator interface 1130 of the illustrated example of FIG. 11 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the example linear actuator interface 1130 actuates the linear actuator 206 to extend the actuating arm 102. In some examples, the linear actuator interface 1130 actuates the linear actuator 206 to extend or retract the inner tube 208 relative to the outer tube 210. However, any other methods to actuate the linear actuator 206 may additionally or alternatively be used.

In the illustrated example of FIG. 11, the fluid dispenser controller 110 of FIG. 1 includes the pump actuator 1140 to activate a pump to pump fluid to a vehicle. The example pump actuator 1140 of the illustrated example of FIG. 8 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example pump actuator 1140 activates the pump 106 to pump a predetermined quantity of fluid from the fluid reservoir 108 to the rotorcraft 300. In examples disclosed herein, the pump actuator 1140 activates the pump 106 by transmitting a signal. However, any other methods to activate the pump 106 may additionally or alternatively be used.

While an example manner of implementing the example fluid dispenser controller 110 of FIG. 1 is illustrated in FIG. 11, one or more of the elements, processes and/or devices illustrated in FIG. 11 may be combined, divided, re-arranged, omitted, eliminated and/or implemented in any other way. Further, the example sensor interface 1110, the example linear actuator interface 1130, the example pump actuator 1140 and/or, more generally, the example fluid dispenser controller 110 of FIG. 11 may be implemented by hardware, software, firmware and/or any combination of hardware, software and/or firmware. Thus, for example, any of the example sensor interface 1110, the example linear actuator interface 1130, the example pump actuator 1140 and/or, more generally, the example fluid dispenser controller 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 1110, the example linear actuator interface 1130, and/or the example pump actuator 1140 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fluid dispenser controller 110 of FIG. 11 may include one or more elements, processes and/or devices in addition to, or instead of, those illustrated in FIG. 11, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
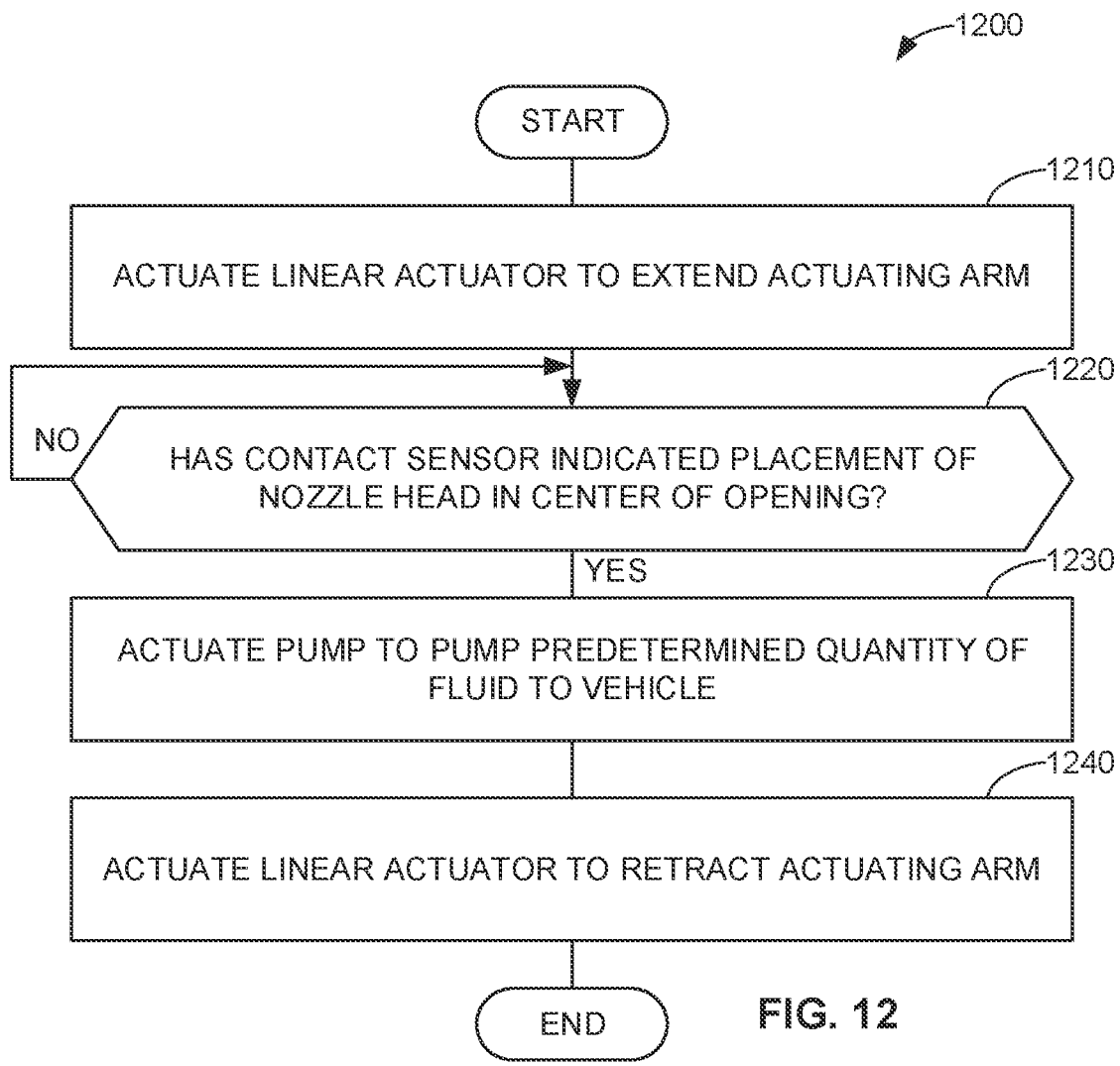
FIG. 12 is a flowchart representative of machine readable instructions which may be executed to implement the fluid dispenser controller of FIG. 11 to actuate the self-aligning liquid coupler system of FIGS. 1-10.

A flowchart representative of example hardware logic, machine readable instructions, hardware implemented state machines, and/or any combination thereof for implementing the fluid dispenser controller 110 of FIGS. 1 and/or 11 is shown in FIG. 12. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example fluid dispenser controller 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of machine-readable instructions for process 1200 which may be executed to implement the fluid dispenser controller 110 of FIGS. 1 and/or 11 to actuate the self-aligning liquid coupler system of FIGS. 1-10. The program of FIG. 12 includes the sensor interface 1110, the linear actuator interface 1130, and the pump actuator 1140 (all of FIG. 11). In the example of FIG. 12, the process 1200 begins after a signal and/or data is received by the sensor interface 1110 of fluid dispenser controller 110 indicating that the rotorcraft 300 has arrived in range of the base components 100. In some examples, the signal and/or data indicating that the rotorcraft 300 is in range of the base components 100 is communicated to the fluid dispenser controller by the communications module 314 (FIG. 3) of the example rotorcraft 300, by a load cell positioned within a predetermined landing area for the example rotorcraft 300, or via any other suitable manner. Though the process 1200 is discussed in connection with the rotorcraft 300, other vehicles can additionally or alternatively be used in connection with the process 1200.

The example linear actuator interface 1130 actuates the linear actuator 206 of FIG. 2 to extend the actuating arm 102 of FIG. 1. (Block 1210). In some examples, the linear actuator interface 1130 actuates the linear actuator 206 by sending a signal to the linear actuator 206. In some examples, the linear actuator 206 extends the inner tube 208 relative to the outer tube 210 (all of FIG. 2) to move the actuating arm 102 in a first direction (e.g., in a counter-clockwise direction in the view of FIG. 4B). The rotation of the actuating arm 102 translates the translating member 200 (FIG. 2) and the nozzle assembly 104 (FIG. 1) towards the rotorcraft 300. However, any other methods to actuate the linear actuator 206 can additionally or alternatively be used.

Once the actuating arm 206 has been extended by the linear actuator interface 1130, the sensor interface 1110 determines whether the contact sensor 1014 indicates placement of the nozzle head 1020 (both of FIG. 10) in the center of the first opening 324 (FIG. 3). (Block 1220). In some examples, the sensor interface 1110 determines whether the contact sensor 1014 indicates placement of the nozzle head 520 in the center of the first opening 324 by receiving a signal and/or data from the contact sensor 1014. If the sensor interface 1110 determines that the contact sensor 1014 has not indicated placement of the nozzle head 1020 in the center of the first opening 324 (e.g., block 1220 returns a result of NO), control returns to the example sensor interface 1110 at block 1220 to continue determining whether the contact sensor 1014 indicates placement.

If the sensor interface 1110 determines that the contact sensor 1014 indicates placement of the nozzle head 520 in the center of the first opening 324 (e.g., block 1220 returns a result of YES), the example pump actuator 1140 actuates the pump 106 to pump a predetermined quantity of fluid from the fluid reservoir 108 (both of FIG. 1) to the rotorcraft 300. (Block 1230). In examples disclosed herein, the pump actuator 1140 activates the pump 106 by sending a signal to the pump 106. However, any other methods to activate the pump 106 may additionally or alternatively be used.

After the predetermined quantity of fluid from the fluid reservoir 108 has been pumped to the rotorcraft 300 (e.g., into the fluid storage tank 318), the example linear actuator interface 1130 actuates the linear actuator 206 to retract the actuating arm 102. In examples disclosed herein, the linear actuator 206 retracts the inner tube 208 relative to the outer tube 210 to move the arm 102 in a second direction (e.g., clockwise in the view of FIG. 4A) to translate the translating member 200 away from the rotorcraft 300. In examples disclosed herein, the linear actuator interface 1130 actuates the linear actuator 206 by communicating a signal to the linear actuator 206. However, any other methods to actuate the linear actuator 206 may additionally or alternatively be used. In some examples, after block 1240, the process 1200 ends.

Figure 13:
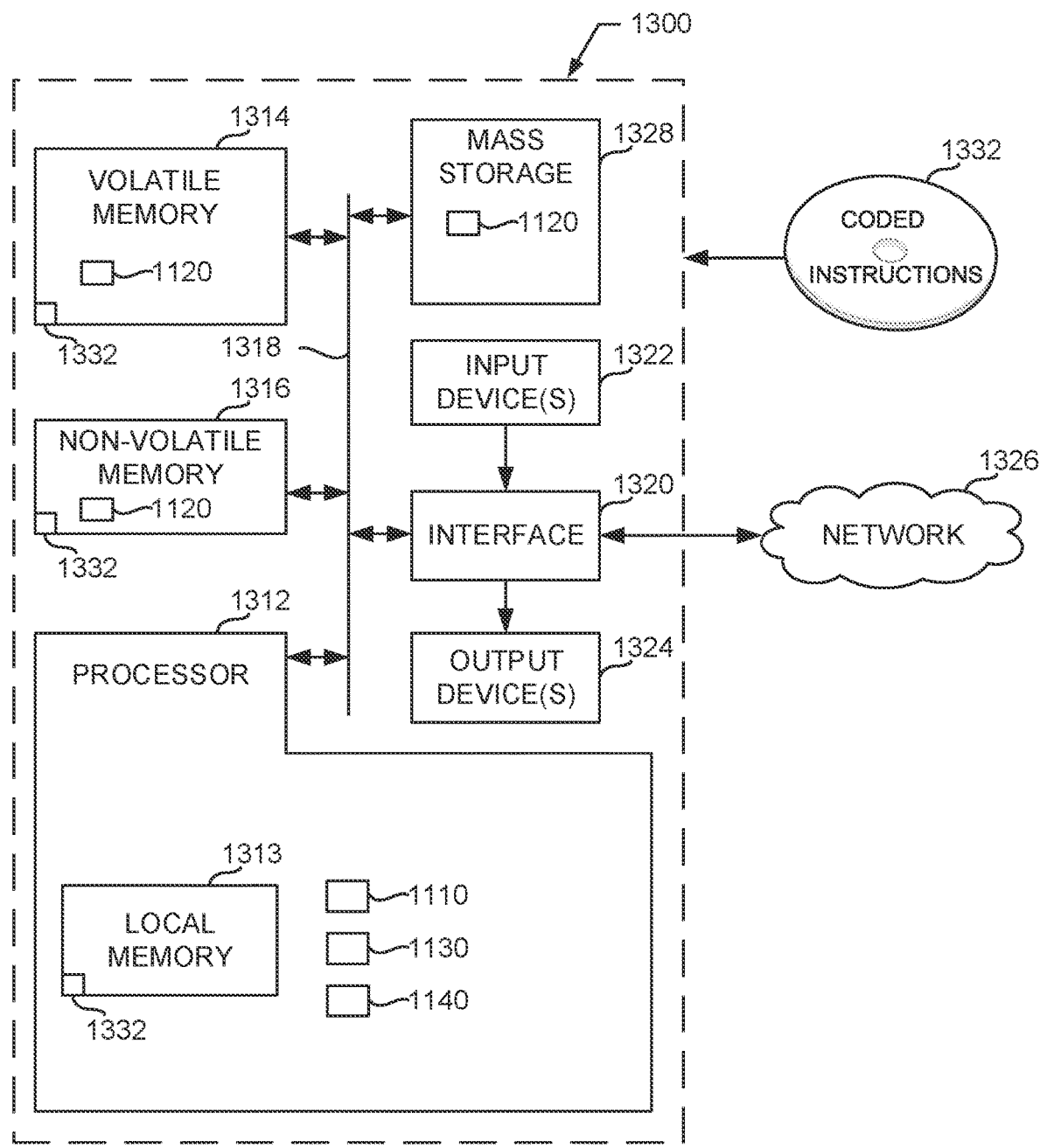
FIG. 13 is a block diagram of an example processing platform structured to execute the instructions of FIG. 12 to implement the example fluid dispenser controller of FIG. 11.

FIG. 13 is a block diagram of an example processor platform 1300 structured to execute the instructions of FIG. 12 to implement the example fluid dispenser controller 110 of FIG. 11. The processor platform 1300 can be, for example, a server, a personal computer, a workstation, a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor can implement the sensor interface 1110, the linear actuator interface 1130, and the pump actuator 1140.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 8 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed for self-aligning liquid coupler systems and related methods.

Example 1 includes an apparatus, comprising a first link to rotate about a pin joint, a second link rotatably coupled to the first link, the second link having a nozzle at a first end and a weight at a second end opposite the first end, and a fluid inlet including a funnel portion and an opening, the funnel portion having a conical taper converging towards the opening.

Example 2 includes the apparatus of example 1, further including a first arm, a second arm, a structure, and a stationary member, and wherein each of the first and second arms are rotatably coupled to each of the structure and the stationary member.

Example 3 includes the apparatus of example 2, further including a linear actuator rotatably coupled to the first arm at a first distance from the structure, the linear actuator rotatably coupled to the second arm at a second distance from the structure, the second distance greater than the first distance.

Example 4 includes the apparatus of example 1, wherein the nozzle and the opening include poppet valve components to fluidly couple the nozzle to the opening.

Example 5 includes the apparatus of example 1, wherein the second link is rotatably coupled to the first link at a pin joint, and wherein the nozzle has a vertical lever arm relative to the pin joint.

Example 6 includes the apparatus of example 1, wherein the opening is fluidly coupled to a fluid storage tank of a rotorcraft.

Example 7 includes the apparatus of example 6, wherein the rotorcraft is an Unmanned Aerial Vehicle (UAV).

Example 8 includes the apparatus of example 1, wherein the conical taper of the funnel portion is to urge the nozzle towards the opening to accommodate misalignment between the nozzle and the opening.

Example 9 includes the apparatus of example 1, further including a pump to pump fluid to the nozzle from a fluid reservoir.

Example 10 includes a nozzle, comprising, a first link rotatably coupled to a base, a second link rotatably coupled to the first link opposite the base, a nozzle head disposed on a first end of the second link, and a weight disposed on a second end of the second link opposite the first end, the weight to urge the nozzle to a position vertically above the weight.

Example 11 includes the nozzle of example 10, further including a fluid channel extending between the nozzle and a pump.

Example 12 includes the nozzle of example 11, wherein the first link includes a central opening, the central opening to receive the fluid channel.

Example 13 includes the nozzle of example 11, wherein the fluid channel is a first fluid channel, further including a second fluid channel fluidly coupled to a reservoir containing fluid fertilizer.

Example 14 includes the nozzle of example 10, wherein the nozzle head includes a contact sensor.

Example 15 includes the nozzle of example 10, wherein the nozzle head includes a check valve.

Example 16 includes the nozzle of example 10, wherein the weight causes the nozzle to rest approximately 10 millimeters horizontally displaced from the weight.

Example 17 includes a method for filling a vehicle, the method comprising actuate a linear actuator to extend an arm to project a nozzle assembly towards a fluid inlet of the vehicle, determining with a sensor interface that the nozzle assembly is located in the fluid inlet, actuating a pump to pump a predetermined quantity of fluid from a fluid reservoir to the vehicle to fill the vehicle, and retracting the arm away from the fluid inlet with the linear actuator.

Example 18 includes the method for filling the vehicle of example 17, wherein the linear actuator is an electric linear actuator driven by a DC motor.

Example 19 includes the method for filling the vehicle of example 17, wherein the determining with the sensor interface that the nozzle assembly is located in the fluid inlet includes accessing data from a contact sensor on the nozzle assembly.

Example 20 includes the method for filling the vehicle of example 17, wherein the vehicle is an Unmanned Aerial Vehicle (UAV).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A nozzle, comprising;
   a first link rotatably coupled to a base;
   a second link rotatably coupled to the first link opposite the base;
   a nozzle head disposed on a first end of the second link; and
   a weight disposed on a second end of the second link opposite the first end, the weight to urge the nozzle to a position vertically above the weight.

2. The nozzle of claim 1, further including a fluid channel extending between the nozzle and a pump.

3. The nozzle of claim 2, wherein the first link includes a central opening, the central opening to receive the fluid channel.

4. The nozzle of claim 2, wherein the fluid channel is a first fluid channel, further including a second fluid channel fluidly coupled to a reservoir containing fluid fertilizer.

5. The nozzle of claim 1, wherein the nozzle head includes a contact sensor.

6. The nozzle of claim 1, wherein the nozzle head includes a check valve.

7. The nozzle of claim 1, wherein the weight causes the nozzle to rest approximately 10 millimeters horizontally displaced from the weight.

* * * * *